United States Patent [19]
Lee et al.

[11] Patent Number: 5,978,180
[45] Date of Patent: Nov. 2, 1999

[54] ACTUATOR FIXING APPARATUS IN HARD DISK DRIVE

[75] Inventors: Joo-Shik Lee, Seoul; Seung-Hyun Lee, Ahnyang, both of Rep. of Korea

[73] Assignee: SamSung Electronics Co., Ltd., Kyungki-do, Rep. of Korea

[21] Appl. No.: 08/605,880

[22] Filed: Feb. 23, 1996

[30]      Foreign Application Priority Data

Mar. 31, 1995  [KR]   Rep. of Korea .......................... 95-7536

[51] Int. Cl.⁶ ...................................................... G11B 5/55
[52] U.S. Cl. .............................................................. 360/106
[58] Field of Search ...................................... 360/104–106, 360/97.1–97.3; 384/461, 490, 610

[56]               References Cited

U.S. PATENT DOCUMENTS

| | | | |
|---|---|---|---|
| 4,682,255 | 7/1987 | Sleger et al. ............................. | 360/106 |
| 4,893,206 | 1/1990 | Shtipelman et al. ..................... | 360/106 |
| 5,510,940 | 4/1996 | Tacklind et al. ......................... | 360/106 |
| 5,535,074 | 7/1996 | Leung ...................................... | 360/105 |

FOREIGN PATENT DOCUMENTS

| | | | |
|---|---|---|---|
| 55-70973 | 5/1980 | Japan ...................................... | 360/106 |
| 5-135515 | 6/1993 | Japan ...................................... | 360/105 |

*Primary Examiner*—Allen T. Cao
*Attorney, Agent, or Firm*—Robert E. Bushnell, Esq.

[57]                ABSTRACT

An apparatus for rotatably connecting an actuator in a hard disk drive includes a housing coupled to a base of the hard disk drive and having an aperture for enabling rotation of the actuator. A pivot is positioned within the housing and provides a recess for connecting the actuator to the pivot. A lower ball bearing assembly positioned between the housing and the pivot includes: a lower outer wheel, a lower inner wheel and a first ball positioned between the lower outer wheel and the lower inner wheel. An upper ball bearing assembly positioned between the housing and the pivot at a spaced apart location from the lower ball bearing assembly includes: an upper outer wheel, an upper inner wheel and a second ball positioned between the upper outer wheel and the upper inner wheel. The apparatus is configured so that the actuator, the pivot, the lower inner wheel and the upper inner wheel are rotatable within the housing, the lower outer wheel and the upper outer wheel as the actuator extends outwardly from the pivot and the housing through the aperture.

20 Claims, 3 Drawing Sheets

ACTUATOR FIXING APPARATUS IN HARD DISK DRIVE

CROSS-REFERENCE TO RELATED APPLICATIONS

This application makes reference to, incorporates the same herein, and claims all benefits accruing under 35 U.S.C. §119 from an application for Actuator Fixing Apparatus In Hard Disk Drive earlier filed in the Korean Industrial Property Office on Mar. 31, 1995 and there assigned Ser. No. 7536/1995.

BACKGROUND OF THE INVENTION

The present invention relates to an actuator in a hard disk drive, and more particularly, to an improved actuator fixing apparatus for reducing the rotational inertia and the moving mass of an actuator body so that data access times are reduced.

A hard disk drive used as a memory device in a computer typically utilizes a rotatable actuator having a magnetic head on one end for reading and writing data from and to a surface of a magnetic disk. When the hard disk drive operates, rotation of the actuator must be carefully controlled in order to properly perform the read or write process. Rotation of the actuator is typically achieved through a voice coil motor that applies a torque upon a body of the actuator. In rotating the actuator, it is intuitive from classical physics that a greater moving mass produces a greater amount of rotational inertia. Accordingly, when designing actuator assemblies, it is desirable to minimize the moving mass of the actuator in order to retain greater control over the movement of the actuator.

One prior art reference directed towards this issue is U.S. Pat. No. 5,315,465 entitled Compliant Pivot Mechanism For A Rotary Actuator issued to Blanks. Blanks '465 discloses a pivot bearing structure for use in a rotary actuator that seeks to reduce the moving mass of the rotary actuator. In particular, tolerance rings are used to fix bearings to the actuator body to allow a thinner wall on the bore in the actuator body. Accordingly, the size of the completed assembly is reduced and the inertia of the actuator is lower. While this design possesses merit in its own right, we believe that an improved design can be contemplated.

SUMMARY OF THE INVENTION

Accordingly, it is an object of the present invention to provide an improved actuator fixing apparatus for a hard disk drive.

It is another object to provide an actuator fixing apparatus for a hard disk drive that reduces the rotational inertia of an actuator body.

It is still another object to provide an actuator fixing apparatus for a hard disk drive that reduces the moving mass of an actuator body.

It is yet another object to provide an actuator fixing apparatus for a hard disk drive that produces reduced data access times.

To achieve these and other objects, the present invention provides an apparatus and method for rotatably connecting an actuator in a hard disk drive. The apparatus comprises a housing coupled to a base of the hard disk drive and having an aperture for enabling rotation of the actuator. A pivot is positioned within the housing and provides a recess for connecting the actuator directly to the pivot. A lower ball bearing assembly positioned between the housing and the pivot includes: a lower outer wheel, a lower inner wheel and a first ball positioned between the lower outer wheel and the lower inner wheel. An upper ball bearing assembly positioned between the housing and the pivot at a spaced apart location from the lower ball bearing assembly includes: an upper outer wheel, an upper inner wheel and a second ball positioned between the upper outer wheel and the upper inner wheel. The apparatus is configured so that the actuator, the pivot, the lower inner wheel and the upper inner wheel are rotatable within the housing, the lower outer wheel and the upper outer wheel as the actuator extends outwardly from the pivot and the housing through the aperture.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
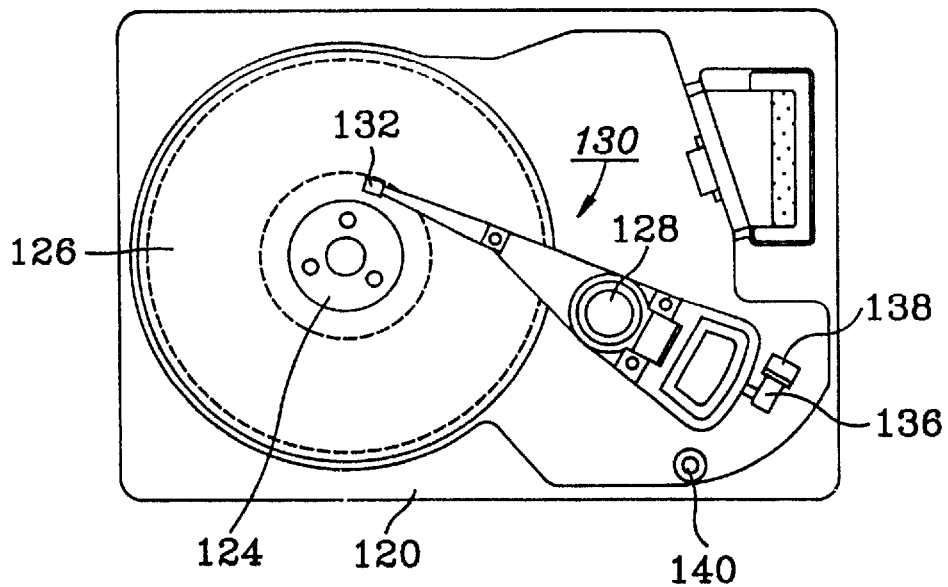
FIG. 1 is a schematic view illustrating a hard disk drive.

Turning now to the drawings and referring to FIG. 1, a conventional hard disk drive used as an auxiliary memory device in a computer is shown. The hard disk drive of FIG. 1 comprises: a spindle motor 124 installed at a predetermined position of a base 120, a disk 126 used as a recording medium and rotated by the driving force of spindle motor 124, an actuator body 130 installed on base 120 by a pivot 128 and having a head 132 on one end which moves across the surface of disk 126.

A rib 136 is installed on an end of actuator body 130 opposite the end where head 132 is installed. A stopper 140 is installed on base 20 for preventing head 132 from leaving the surface of disk 126 by restricting the angle in which actuator body 130 can rotate. Stopper 140 is installed to be capable of contacting rib 136. A magnet 138 is installed on base 120 for retaining actuator body 130 in a state where head 132 is positioned in a parking area of disk 126.

Figure 2:
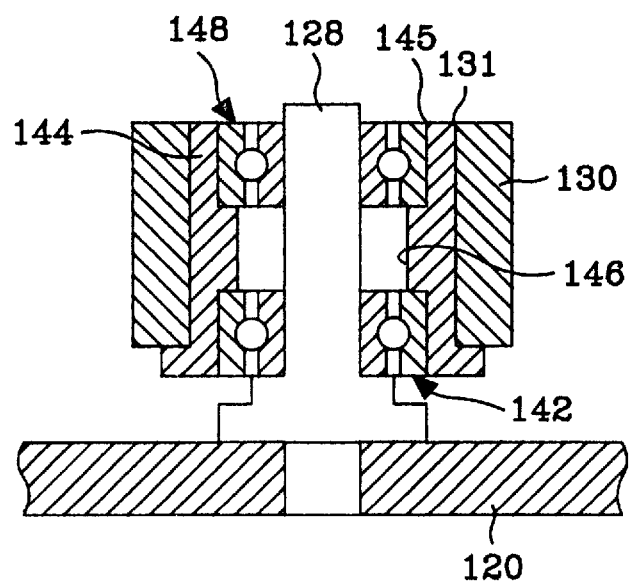
FIG. 2 is a cross sectional view illustrating the installation of an actuator in a conventional hard disk drive.

As shown in FIG. 2, actuator body 130 has an inner hole represented by reference number 131 in which pivot 128 is positioned within. A lower ball bearing assembly 142 including inner and outer wheels and balls between the wheels is positioned about a lower portion of pivot 128. An upper ball bearing assembly 148 having inner and outer wheels and balls between the wheels is positioned about an upper portion of pivot 128. A housing 144 has a cylindrical hole represented by reference number 145 formed within an inner portion thereof. A protrusion 146 formed on housing 144 extends into cylindrical hole 145 and abuts an upper portion of lower ball bearing assembly 142 and a lower portion of upper ball bearing assembly 148. Actuator body 130 is assembled onto housing 144. In FIG. 2, actuator body 130, housing 144 and the outer wheels of ball bearing assemblies 142 and 148 rotate about pivot 128 and the inner wheels of ball bearing assemblies 142 and 148.

The conventional configuration shown in FIG. 2, however, produces an unnecessary amount of rotational inertia since the mass of both housing 144 and actuator body 130 is rotated about pivot 128. Accordingly, the amount of force required to move head 132 during reading and writing is increased.

Figure 3:
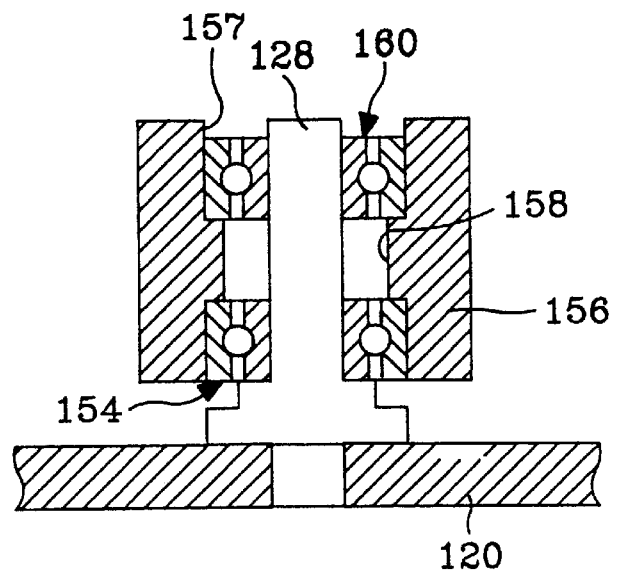
FIG. 3 is a cross sectional view illustrating the installation of an actuator in another conventional hard disk drive.

FIG. 3 is a cross sectional view illustrating the installation of an actuator in another conventional hard disk drive. The configuration shown in FIG. 3 produces a reduced amount of rotational inertia, as compared to the configuration of FIG. 2, since an actuator body 156 directly engages the outer wheels of ball bearing assemblies 154 and 160.

Referring to FIGS. 1 and 3, the structure and operation of the actuator assembly will now be described in detail.

Pivot 128 is installed to extend upwardly from base 120 of the hard disk drive, and a protrusion 158 formed on actuator body 156 extends into an inner hole 157 of actuator body 156. Lower ball bearing assembly 154 having inner and outer wheels and balls between the wheels is positioned about a lower portion of pivot 128, and upper ball bearing assembly 160 having a similar construction is positioned about an upper portion of pivot 128. Actuator body 156 is positioned about pivot 128 and ball bearing assemblies 154 and 160 such that protrusion 158 abuts an upper portion of lower ball bearing assembly 154 and a lower portion of upper ball bearing assembly 160. is Actuator body 156 and the outer wheels of ball bearing assemblies 154 and 160 rotate about pivot 128 and the inner wheels of ball bearing assemblies 154 and 160 in response to the electromotive force of a voice coil motor (not shown).

The configuration shown in FIG. 3 is designed to produce less rotational inertia than the configuration shown in FIG. 2. However, we have observed that the rotational inertia of an actuator may be reduced even further, and data access times improved, through utilizing the principles of the present invention.

Figure 4:
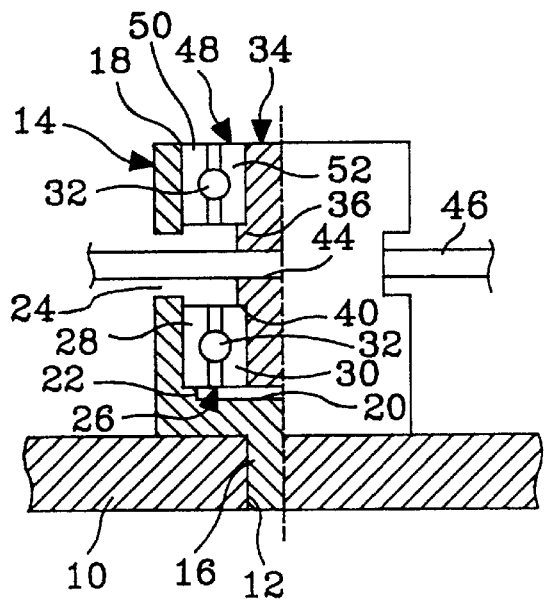
FIG. 4 is a cross sectional view illustrating the installation of an actuator in a hard disk drive according to a first embodiment of the present invention.

Referring now to FIG. 4, a cross sectional view illustrating the installation of an actuator in a hard disk drive according to a first embodiment of the present invention is shown. FIG. 4 comprises a housing 14 having a coupler 16 inserted within a hole 12 formed in a base 10. A groove represented by reference number 18 is formed between housing 14 and a pivot 34, and has a lower surface 20 formed in housing 14. A protruding portion 22 having a predetermined size is coaxially formed in housing 14 on lower surface 20 of groove 18, and an aperture 24 is formed perpendicularly to groove 18. A lower ball bearing assembly 26 having a lower outer wheel 28, a lower inner wheel 30 and a ball 32 assembled between the wheels is positioned on protruding portion 22 of housing 14. An upper ball bearing assembly 48 having an upper outer wheel 50, an upper inner wheel 52 and a ball 32 assembled between the wheels supports the upper portion of pivot 34 and is inserted between pivot 34 and housing 14. A protruding step 36 is formed in pivot 34 for applying a preload (i.e., force) to upper inner wheel 52, and has a lower surface 40 for applying a preload to lower inner wheel 30. A recess 44 is provided for installing an actuator body 46 by penetrating pivot 34.

Protruding step 36 and protruding portion 22 are symetrically disposed in the configuration and apply preloads to upper and lower ball bearing assemblies 48 and 26, respectively. Aperture 24 is formed in housing 14 to provide a path for the predetermined angular rotation of actuator body 46.

To assemble the embodiment of the present invention shown in FIG. 4, coupler 16 of housing 14 is inserted into hole 12 of base 10. Lower ball bearing assembly 26 is placed at protruding portion 22 of housing 14. Pivot 34 is then assembled with lower ball bearing assembly 26 such that recess 44 corresponds to the center of aperture 24. Accordingly, protruding portion 22 pushes lower outer wheel 28 in one direction, and lower surface 40 of protruding step 36 pushes lower inner wheel 30 in another direction so that the preload is applied to lower ball bearing assembly 26. Next, upper ball bearing assembly 48 is placed within groove 18 to be assembled between pivot 34 and housing 14. Finally, actuator body 46 is connected to pivot 34 within recess 44 and aperture 24 of housing 14. After assembly, actuator body 46, which is supported by pivot 34, can rotate upon application of power to the voice coil motor (not shown). In the embodiment shown in FIG. 4, actuator body 46, upper inner wheel 52, lower inner wheel 30 and pivot 34 rotate within upper outer wheel 50, lower outer wheel 28 and housing 14. Housing 14 does not prohibit the rotation of actuator body 46 due to the formation of aperture 24.

As seen from the embodiment of FIG. 4, rotational inertia can be reduced, as compared to conventional configurations. Accordingly, the force required to rotate actuator body 46 is reduced, and faster access times can be achieved.

Figure 5:
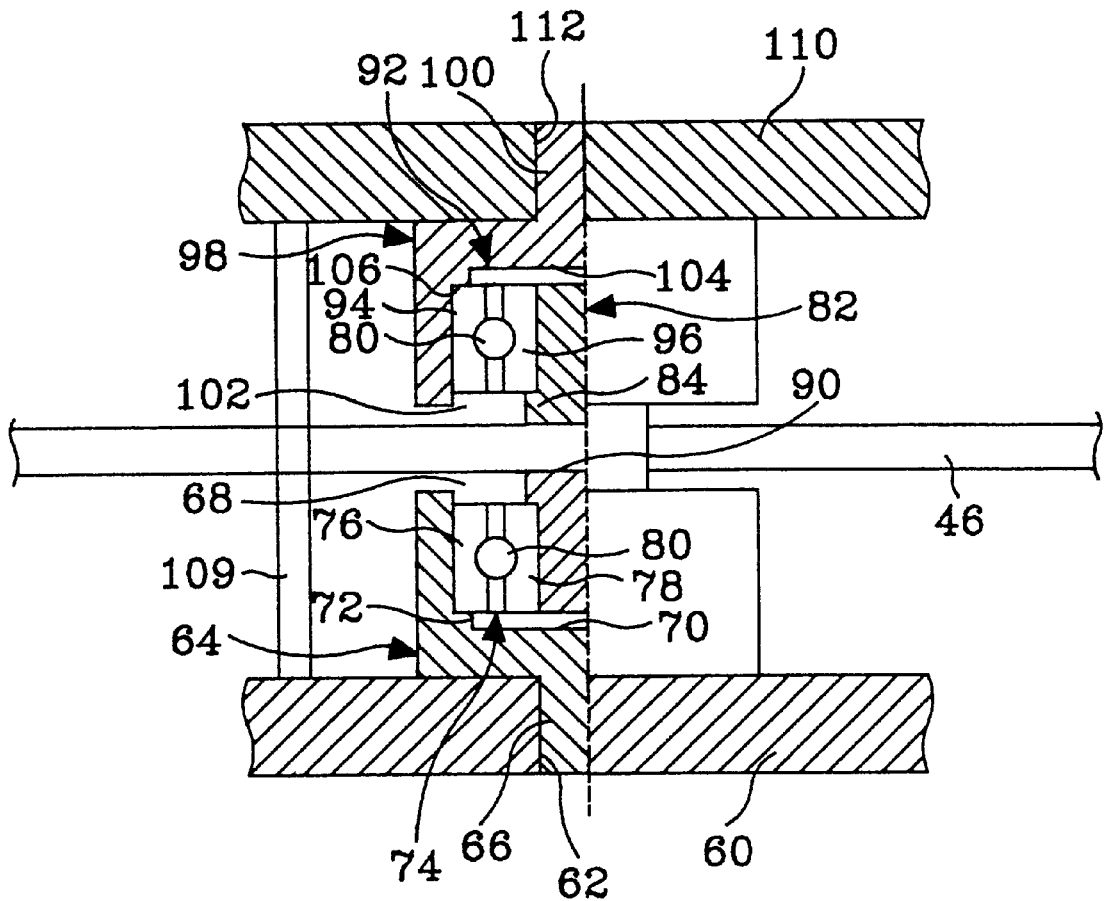
FIG. 5 is a cross sectional view illustrating the installation of an actuator in a hard disk drive according a second embodiment of the present invention.

Referring now to FIG. 5, a cross sectional view illustrating the installation of an actuator in a hard disk drive according a second embodiment of the present invention is shown. FIG. 5 comprises a base 60 having a hole 62 and a cover 110 having a hole 112. Holes 62 and 112 have predetermined diameters and are located at predetermined positions. A lower housing 64 includes a coupler 66 inserted into hole 62 of base 60, a cylindrical groove 68 and a protruding portion 72 coaxially formed to a predetermined size on an inside lower surface 70 of groove 68. A lower ball bearing assembly 74 placed on protruding portion 72 of lower housing 64 includes a lower outer wheel 76, a lower inner wheel 78, and a ball 80 assembled between the wheels. An upper ball bearing assembly 92 includes an upper outer wheel 94, an upper inner wheel 96 and a ball 80 assembled between the wheels. A pivot 82, which engages lower inner wheel 78 and upper inner wheel 96, includes a protruding step 84 for applying a preload to upper inner wheel 96. A recess 90 is provided for insertion and assembly of an actuator body 46. An upper housing 98 includes a coupler 100 inserted into hole 112 formed in cover 110, a cylindrical groove 102 and a protruding portion 106 coaxially formed to a predetermined size on an inner upper surface 104 of groove 102. A supporter 109 connecting base 60 and cover 110 is provided for applying a preload to upper and lower ball bearing assemblies 92 and 74.

To assemble the embodiment of the present invention shown in FIG. 5, coupler 66 of lower housing 64 is inserted into hole 62 of base 60. Lower ball bearing assembly 74 is then placed at protruding portion 72 of lower housing 64. Pivot 82 is placed on lower inner wheel 78. Upper ball bearing assembly 92 is positioned at an upper portion of pivot 82, and upper housing 98 is placed so that protruding portion 106 contacts upper outer wheel 94. Actuator body 46 is then assembled to penetrate through recess 90 of pivot 82. One end of supporter 109 is fixed to base 60. Finally, while coupler 100 of upper housing 98 is inserted within hole 112 of cover 110, the other end of supporter 109 is fixed to cover 110. In the embodiment shown in FIG. 5, actuator body 46, upper inner wheel 96, lower inner wheel 78 and pivot 82 rotate within upper outer wheel 94, lower outer wheel 76, upper housing 98 and lower housing 64 as actuator body 46 extends outwardly through an aperture formed between upper housing 98 and lower housing 64.

Since supporter 109 is fixed to base 60 and cover 110, protruding portions 106 and 72 of upper and lower housings 98 and 64 and protruding step 84 of pivot 82 apply force to upper and lower outer wheels 94 and 76 and upper and lower inner wheels 96 and 78 so that a preload is applied to upper and lower ball bearing assemblies 92 and 74.

In the embodiment of the present invention shown in FIG. 5, actuator body 46 rotates by an electromotive force while being supported by pivot 82. Pivot 82 is supported by upper and lower ball bearing assemblies 92 and 74, which are supported by upper and lower housings 98 and 64, respectively.

As described above, in the actuator fixing apparatus of the hard disk drive according to the present invention, the mass rotated by the voice coil motor is reduced by directly fixing the actuator body to the pivot, thus reducing inertia. Accordingly, the force required to rotate the actuator body is reduced, and access time is faster.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for rotatably connecting an actuator in a hard disk drive, said apparatus comprising:
    a housing having an aperture accommodating an actuator;
    a pivot rotatably mounted within said housing and defining an orifice extending completely through said pivot, said actuator being received in the orifice and completely penetrating said pivot through the orifice, and said actuator not encircling said pivot;
    a lowerball bearing assembly positioned between said housing and said pivot, said lowerball bearing assembly comprising a lower outer wheel, a lower inner wheel and a first ball positioned between said lower outer wheel and said lower inner wheel;
    an upper ball bearing assembly positioned between said housing and said pivot at a spaced apart location from said lower ball bearing assembly, said upper ball bearing assembly comprising an upper outer wheel, an upper inner wheel and a second ball positioned between said upper outer wheel and said upper inner wheel; and
    said actuator, said pivot, said lower inner wheel and said upper inner wheel being rotatable within said housing, said lower outer wheel, and said upper outer wheel as said actuator extends outwardly from said pivot and said housing through said aperture.

2. The apparatus of claim 1,
    wherein said housing comprises a first protrusion contacting said lower outer wheel of said lower ball bearing assembly and applying a first force to said lower ball bearing assembly.

3. The apparatus of claim 1, wherein said pivot further comprises a second protrusion applying a second force to said outer wheel of said upper ball bearing assembly.

4. The apparatus as of claim 2, wherein said pivot comprises a second protrusion applying a second force to said upper ball bearing assembly.

5. The apparatus of claim 1, wherein said housing further comprises a coupler insertable into an aperture in said base of said hard disk drive to couple said housing to said base.

6. An apparatus for rotatably connecting an actuator in a hard disk drive, said apparatus comprising:
    a first housing connected to a base of said hard disk drive;
    a second housing connected to a cover of said hard disk drive;
    a supporter for connecting said base and said cover;
    an aperture formed between said first housing and said second housing to enable rotation of said actuator;
    a pivot rotatably mounted within said first and second housings, said pivot defining an orifice extending completely through said pivot, said actuator being received in the orifice and completely penetrating said pivot through the orifice, and said actuator not encircling said pivot;
    a lower ball bearing assembly positioned between said first housing and said pivot, said lower ball bearing assembly comprising a lower outer wheel, a lower inner wheel and a first ball positioned between said lower outer wheel and said lower inner wheel;
    an upper ball bearing assembly positioned between said second housing and said pivot at a spaced apart location from said lower ball bearing assembly, said upper ball bearing assembly comprising an upper outer wheel, an upper inner wheel and a second ball positioned between said upper outer wheel and said upper inner wheel; and
    said actuator, said pivot, said lower inner wheel and said upper inner wheel being rotatable within said first housing, said second housing, said lower outer wheel and said upper outer wheel as said actuator extends outwardly from said pivot and said first and second housings through said aperture.

7. The apparatus as recited in claim 6, wherein said first housing comprises a first protrusion contacting said lower outer wheel of said lower ball bearing assembly and applying a first force to said lower ball bearing assembly.

8. The apparatus of claim 7, wherein said second housing further comprises a second protrusion contacting said upper outer wheel of said upper ball bearing assembly and applying a second force to said upper ball bearing assembly.

9. The apparatus of claim 6, wherein said first housing further comprises a first coupler that inserts into a first hole formed in said base of said hard disk drive to couple said first housing to said base.

10. The apparatus of claim 9, wherein said second housing further comprises a second coupler that inserts into a second hole formed in said cover of said hard disk drive to couple said second housing to said cover.

11. A method for assembling an actuator in a hard disk drive, comprising the steps of:
    mounting a housing to a base of a hard disk drive;
    placing a first bearing assembly within said housing;
    rotatably mounting a pivot within said housing, said first bearing assembly being interposed between said housing and said pivot, said pivot defining an orifice extending completely through said pivot; and
    receiving said actuator into the orifice defined by said pivot, said actuator completely penetrating said pivot through the orifice, and said actuator not encircling said pivot.

12. A method for assembling an actuator in a hard disk drive, comprising the steps of:
    connecting a first housing to a base of said hard disk drive;
    placing a first ball bearing assembly within a groove formed in said first housing so that a first corner of said first ball bearing assembly abuts a first protrusion formed in said first housing;

rotatable mounting a pivot within said first housing so that a second corner of said first ball bearing assembly abuts a second protrusion formed in said pivot, said pivot defining an orifice extending completely through said pivot;

placing a second ball bearing assembly adjacent to said pivot at a spaced apart location from said first ball bearing assembly;

placing a second housing upon said second ball bearing assembly to secure said second ball bearing assembly between said pivot and said second housing; and receiving said actuator into the orifice defined by said pivot, said actuator completely penetrating said pivot through the orifice, enabling said actuator and said pivot to rotate within said first and second housings as said actuator extends outwardly from said pivot and said first and second housings through an aperture formed between said first housing and said second housing, said actuator not encircling said pivot.

13. The method of claim 12, further comprising a step of providing a connection between said base and a cover connected to said second housing by connecting a first end of a supporter to said base and connecting a second end of said supporter to said cover.

14. An apparatus for rotatably connecting an actuator in a hard disk drive, comprising:

a first housing perforated by an aperture;

a pivot rotatably mounted within said housing, said pivot having an actuator recessed into a surface, and extending through said aperture, said actuator rotating in accordance with rotation of said pivot and aperture, said pivot defining an orifice extending completely through said pivot, said actuator being received in the orifice and completely penetrating said pivot through the orifice, and said actuator not encircling said pivot;

a first journal interspersed between said housing and a first end of said pivot with an inner race of said journal supporting said pivot; and a second journal spaced apart from said first journal, interspersed between said housing and a second and opposite end of said pivot with an inner race of said journal supporting and rotating with said pivot as said pivot turns relative to said housing.

15. The apparatus of claim 14, with said second journal further comprising:

a ball bearing assembly disposed between said housing and said pivot, said ball bearing assembly comprising an outer race, said inner race and a first plurality of balls positioned between said outer race and said inner race.

16. The apparatus of claim 14, further comprising:

a base for said hard disk drive, said base having a first perforation engaging said housing;

a cover having a second perforation engaging said housing; and a support having one distal end mounted on said cover and having a second distal end mounted on said base.

17. An apparatus for rotatably connecting an actuator in a hard disk drive, said apparatus comprising:

a housing having an aperture accommodating an actuator;

a pivot being rotatably mounted within said housing and being connectable to said actuator, said pivot defining an orifice extending completely through said pivot, said actuator being received in the orifice and completely penetrating said pivot through the orifice, and said actuator not encircling said pivot; and a first set of bearings interposed between said housing and said pivot.

18. An apparatus for rotatably connecting an actuator in a hard disk drive, said apparatus comprising:

a housing having an aperture accommodating of an actuator;

a pivot being rotatably mounted within said housing and being connectable to said actuator, said pivot defining an orifice extending completely through said pivot, said actuator being received in the orifice and completely penetrating said pivot through the orifice, and said actuator not encircling said pivot;

a first set of bearings interposed between said housing and said pivot;

a second set of bearings interposed between said housing and said pivot;

said first set of bearings comprising a lower outer race, a lower inner race and a plurality of balls therebetween; and said second set of bearings comprising an upper outer race, an upper inner race and a plurality of balls therebetween.

19. An apparatus for rotatably connecting an actuator in a hard disk drive, comprising:

a first housing;

a second housing;

a pivot rotatably mounted within said first housing and said second housing, said pivot defining an orifice extending completely through said pivot, said actuator being received in the orifice and completely penetrating said pivot through the orifice, and said actuator not encircling said pivot;

said first housing and said second housing defining an aperture accommodating passage of an actuator that may extend from said pivot;

a first set of bearings interposed between said first housing and said pivot;

a second set of bearings interposed between said second housing and said pivot;

said first set of bearings comprising a lower outer race, a lower inner race and a plurality of balls therebetween; and said second set of bearings comprising an upper outer race, an upper inner race and a plurality of balls therebetween.

20. A method for assembling an actuator in a hard disk drive, comprising the steps of:

mounting a first housing to a base of a hard disk drive;

placing a first bearing assembly within said first housing;

rotatably mounting a pivot within said first housing, with said first bearing assembly being interposed between said first housing and said pivot, said pivot defining an orifice extending completely through said pivot, said actuator being received in the orifice and completely penetrating said pivot through the orifice, and said actuator not encircling said pivot;

connecting said actuator to said pivot;

placing a second bearing assembly about said pivot;

placing a second housing on said second bearing assembly; and said first bearing assembly interposed between said pivot and said first housing and said second bearing assembly interposed between said pivot and said second housing.

* * * * *